(12) United States Patent
Lee (10) Patent No.: US 8,557,447 B2
(45) Date of Patent: Oct. 15, 2013

(54) RECHARGEABLE LITHIUM BATTERY INCLUDING A NOVEL ELECTROLYTE COMPOSITION

(75) Inventor: Doo-Kyoung Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 567 days.

(21) Appl. No.: 12/208,628

(22) Filed: Sep. 11, 2008

(65) Prior Publication Data

US 2009/0068565 A1    Mar. 12, 2009

(30) Foreign Application Priority Data

Sep. 12, 2007 (KR) .................. 10-2007-0092762

(51) Int. Cl.
*H01M 4/48* (2010.01)
*H01M 6/16* (2006.01)

(52) U.S. Cl.
USPC ......... 429/331; 429/333; 429/338; 429/218.1

(58) Field of Classification Search
USPC ......... 429/331, 332, 333, 330, 334, 335, 307, 429/231.95, 326, 231.1, 218.1, 338; 252/62.2
See application file for complete search history.

(56) References Cited

U.S. PATENT DOCUMENTS

| 4,054,729 A * | 10/1977 | Isenberg ................. 429/112 |
| 7,266,704 B2 | 9/2007 | Levy |
| 2003/0118912 A1 * | 6/2003 | Watanabe et al. ............. 429/326 |

(Continued)

FOREIGN PATENT DOCUMENTS

| CN | 1402366 A | 3/2003 |
| CN | 1507668 A | 6/2004 |

(Continued)

OTHER PUBLICATIONS

WO 2005/104288 A1, World Intellect, Hennige et al., Nov. 2005.*

(Continued)

*Primary Examiner* — Basia Ridley
*Assistant Examiner* — Kenneth Douyette
(74) *Attorney, Agent, or Firm* — Christie, Parker & Hale, LLP (57) ABSTRACT

The rechargeable lithium battery includes: a negative electrode including a non-carbon-based negative active material; a positive electrode including a positive active material that reversibly intercalates and deintercalates lithium ions; and an electrolyte that includes a non-aqueous organic solvent that includes ethylene carbonate in an amount of 20 volume % or less, a lithium salt including $LiPF_6$, a first additive represented by the following Formula 1 and a second additive that is $LiB(C_2O_4)_2$. The electrolyte has a viscosity of 3.02 cP or less:

[Chemical Formula 1]

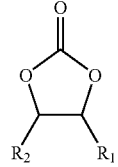

wherein, $R_1$ and $R_2$ are independently selected from the group consisting of hydrogen, a halogen, a cyano (CN), a nitro ($NO_2$), and a C1 to C5 fluoroalkyl, provided that at least one of $R_1$ and $R_2$ is selected from the group consisting of a halogen, a cyano (CN), a nitro ($NO_2$), and a C1 to C5 fluoroalkyl.

13 Claims, 4 Drawing Sheets

(56) References Cited

U.S. PATENT DOCUMENTS

| | | | |
|---|---|---|---|
| 2003/0157407 A1* | 8/2003 | Kosuzu et al. | 429/231.95 |
| 2004/0076887 A1* | 4/2004 | Panitz et al. | 429/330 |
| 2005/0014070 A1* | 1/2005 | Palanisamy et al. | 429/326 |
| 2005/0142448 A1* | 6/2005 | Kim et al. | 429/326 |
| 2005/0191553 A1* | 9/2005 | Fujihara et al. | 429/231.1 |
| 2005/0287442 A1* | 12/2005 | Kim et al. | 429/326 |
| 2006/0160000 A1* | 7/2006 | Kim | 429/332 |
| 2007/0212615 A1* | 9/2007 | Jost et al. | 429/326 |

FOREIGN PATENT DOCUMENTS

| | | |
|---|---|---|
| CN | 1732588 | 2/2006 |
| CN | 1846326 | 10/2006 |
| JP | 2006-216378 | 8/2006 |
| KR | 2006-41828 | 5/2006 |
| KR | 2006-52454 | 5/2006 |
| KR | 2007-14677 | 2/2007 |
| WO | WO 2006/082912 | 8/2006 |

OTHER PUBLICATIONS

"Binder effect on cycling performance of silicon/carbon composite anodes for lithium ion batteries", Chen et al., Journal of Applied Electrochemistry (2006) 36:1099-1104.*

Chinese Office Action dated Mar. 12, 2010, issued in corresponding Chinese Patent Application No. 200810149607.

SIPO Office action dated Nov. 29, 2010, for corresponding Chinese Patent application 200810149607.0, with English translation, noting listed references in this IDS.

SIPO Office action dated Mar. 30, 2011, for corresponding Chinese Patent application 200810149607.0, with English translation.

SIPO Office action dated Sep. 6, 2011, for corresponding Chinese Patent application 200810149607.0, with English translation, 14 pages.

* cited by examiner

RECHARGEABLE LITHIUM BATTERY INCLUDING A NOVEL ELECTROLYTE COMPOSITION

CROSS-REFERENCE TO RELATED APPLICATION

This application claims the benefit of Korean Patent Application No. 2007-92762 filed in the Korean Intellectual Property Office on Sep. 12, 2007, the disclosure of which is incorporated herein by reference.

BACKGROUND OF THE INVENTION

1. Field of the Invention

Aspects of the present invention relate to a rechargeable lithium battery. More particularly, aspects of the present invention relates to a rechargeable lithium battery having an excellent cycle life.

2. Description of the Related Art

Because lithium secondary batteries that include a non-aqueous electrolyte are known to generate a high voltage, and have high energy density and good storage characteristics as well as good operability at a low temperature, lithium secondary batteries are widely used in portable personal electronic devices. Accordingly, development has continued for high-capacity batteries as an electricity source of electronic devices.

In order to provide high-capacity batteries, metal materials such as Si, Sn, and Al have been developed as novel materials to be substituted for carbon-based negative active material. However, a rechargeable lithium battery including a non-carbon-based negative electrode typically has an improved capacity compared to a lithium battery including a carbon-based negative electrode, but typically exhibits a poor cycle life. For example, high-capacity batteries using these metal materials as a negative active material have not yet been commercialized because the metals such as Si, Sn, Al, and so on tend to form an alloy with lithium during charge-discharge cycles and undergo volume expansion and shrinkage resulting in pulverization. As a result, the cycle life of batteries may deteriorate.

Therefore, amorphous alloys have been suggested as a negative active material to improve cycle-life characteristics. Amorphous Si oxide alloy materials have relatively higher initial capacity retention than crystalline alloy materials, but the capacity retention thereof may be sharply decreased after repeating charge and discharge cycles.

Moreover, Korean Patent Laid-Open Publication No. 2006-41828 discloses that an electrolyte including a halogen-containing carbonate such as 4-fluoroethylene carbonate improves cycle-life characteristics of a battery including the non-carbon-based negative electrode, but the improvement is limited.

SUMMARY OF THE INVENTION

According to one aspect of the present invention there is provided a rechargeable lithium battery having excellent cycle-life characteristics.

According to an embodiment of the present invention, a rechargeable lithium battery includes: a negative electrode including a non-carbon-based negative active material; a positive electrode including a positive active material that reversibly intercalates and deintercalates lithium ions; and an electrolyte that includes a non-aqueous organic solvent that includes ethylene carbonate in amount of 20 volume % or less based on a total volume of the non-aqueous organic solvent, a lithium salt including $LiPF_6$, and an additive including a first additive represented by the following Formula 1 and a second additive including $LiB(C_2O_4)_2$. The electrolyte has a viscosity of 3.02 cP or less.

[Chemical Formula 1]

In the above Formula 1, $R_1$ and $R_2$ are independently selected from the group consisting of hydrogen, a halogen, a cyano (CN), a nitro ($NO_2$), and a C1 to C5 fluoroalkyl, provided that at least one of $R_1$ and $R_2$ is selected from the group consisting of a halogen, a cyano (CN), a nitro ($NO_2$), and a C1 to C5 fluoroalkyl.

A stable passivation film at the interface of a non-carbon-based negative electrode and an electrolyte improves cycle-life characteristics of a rechargeable lithium battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The electrolyte according to one embodiment of the present invention includes a non-aqueous organic solvent that includes ethylene carbonate in an amount of 20 volume % or less based on a total volume of the non-aqueous organic solvent, a lithium salt including $LiPF_6$, a first additive represented by the following Formula 1, and a second additive that is $LiB(C_2O_4)_2$. The electrolyte has a viscosity of 3.02 cP or less.

[Chemical Formula 1]

In the above Formula 1, $R_1$ and $R_2$ are independently selected from the group consisting of hydrogen, a halogen, a cyano (CN), a nitro ($NO_2$), and a C1 to C5 fluoroalkyl, provided that at least one of $R_1$ and $R_2$ is selected from the group consisting of a halogen, a cyano (CN), a nitro ($NO_2$), and a C1 to C5 fluoroalkyl.

The rechargeable lithium battery according to another embodiment of the present invention includes a non-carbon-based negative active material and the electrolyte described above.

Hereinafter, the constituent components of the electrolyte including the non-aqueous organic solvent, the lithium salt, the first additive, and the second additive are described in more detail.

The lithium salt supplies lithium ions in the battery, and allows a basic operation of a rechargeable lithium battery and improves lithium ion transport between positive and negative electrodes. For the lithium salt, any lithium salt used in rechargeable lithium batteries may be used, such as, for example, $LiPF_6$.

$LiPF_6$ may be used at a concentration of 1.15 to 2.5M. According to one embodiment, $LiPF_6$ may be used at a concentration of 1.3 to 2.0M. When $LiPF_6$ is used at a concentration of less than 1.15M, lithium ion transporting speed may be reduced due to insufficient lithium ions. On the other hand, if $LiPF_6$ is used at a concentration of more than 2.5M, interface resistance may be sharply increased.

The first additive improves safety of the rechargeable lithium battery, and is represented by the following Formula 1:

[Chemical Formula 1]

wherein, $R_1$ and $R_2$ are independently selected from the group consisting of hydrogen, a halogen, a cyano (CN), a nitro ($NO_2$), and a C1 to C5 fluoroalkyl, provided that at least one of $R_1$ and $R_2$ is selected from the group consisting of a halogen, a cyano (CN), a nitro ($NO_2$), and a C1 to C5 fluoroalkyl.

Examples of the first additive include one selected from the group consisting of fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof. As a specific, non-limiting example, the first additive may be fluoroethylene carbonate.

The first additive is included in an amount of 0.1 to 10 parts by weight based on 100 parts by weight of the electrolyte. As a non-limiting example, the first additive may be included in an amount of 1 to 8 parts by weight based on 100 parts by weight of the electrolyte. When the first additive is included in an amount of less than 0.1 parts by weight, an electrolyte decomposition reaction at an active material surface may not be sufficiently suppressed and the decomposed products may decrease the cycle-life characteristics of the battery. When the first additive is included in an amount of more than 10 parts by weight, lithium ion delivery to the interior of the active material from an electrolyte may be decreased.

The second additive, $LiB(C_2O_4)_2$, improves the cycle-life characteristics of the battery. As non-limiting examples, the second additive may be included in an amount of 0.1 to 5 parts by weight, or more specifically, in an amount of 0.2 to 3 parts by weight based on 100 parts by weight of the electrolyte. When the second additive is included in an amount of less than 0.1 parts by weight, cycle-life characteristics may not be improved sufficiently, while when the second additive is included in an amount of more than 5 parts by weight, the electrolyte viscosity may be increased.

The non-aqueous organic solvent acts as a medium for transmitting ions taking part in the electrochemical reactions of the battery.

The non-aqueous organic solvent includes ethylene carbonate in an amount of 20 volume % or less based on a total volume of the non-aqueous organic solvent. According to one embodiment, the ethylene carbonate is included in an amount of 5 to 20 volume %. When the ethylene carbonate content is more than 20 volume %, cycle-life characteristics may deteriorate due to increased viscosity. When ethylene carbonate is used in an amount of 5 volume % or more, cycle-life characteristics of the battery may be improved due to passivation film formation on the surface of a negative electrode.

As non-limiting examples, the non-aqueous organic solvent may include at least one of an ether-based, carbonate-based, ester-based, ketone-based, alcohol-based, or aprotic solvent, as well as the ethylene carbonate. The non-aqueous organic solvent may be used singularly or in a mixture. When the organic solvent is used in a mixture, a mixture ratio can be controlled in accordance with a desirable battery performance.

Specific examples of the ether-based solvent include at least one selected from the group consisting of dimethoxyethane (DME), bis(2-methoxyethyl)ether (DGM), triethylene glycol dimethylether (TEGDME), tetraethylene glycol dimethylether (TetGM), polyethylene glycol dimethylether (PEGDME), propylene glycol dimethylether (PGDME), dioxolane, and combinations thereof.

Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), propylene carbonate (PC), butylene carbonate (BC), and so on. (Since the amount of ethylene carbonate is separately specified in the non-aqueous organic solvent, ethylene carbonate is omitted from this list of additional carbonate-based solvents.)

Examples of the ester-based solvent include methyl acetate, ethyl acetate, n-propyl acetate, methylpropionate, ethylpropionate, γ-butyrolactone, decanolide, valerolactone, mevalonolactone, caprolactone, and so on.

Examples of the ketone-based solvent include cyclohexanone and so on, and examples of the alcohol-based solvent include ethanol, isopropyl alcohol, and so on.

Examples of the aprotic solvent include nitrites such as X—CN (wherein X is a C2 to C20 linear, branched, or cyclic hydrocarbon group including a double bond, an aromatic ring, or an ether bond), amides such as dimethylformamide, dioxolanes such as 1,3-dioxolane, sulfolanes, and so on.

In addition, the electrolyte according to aspects of the present invention may further include mixtures of carbonate-based solvents and aromatic hydrocarbon-based solvents.

The aromatic hydrocarbon-based organic solvent may be represented by the following Formula 2:

[Chemical Formula 2]

wherein, $R_3$ to $R_8$ are independently selected from the group consisting of hydrogen, a halogen, a C1 to C10 alkyl, a C1 to C10 haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte having the above structure has a viscosity of 3.02 cP or less. As a non-limiting example, the electrolyte may have a viscosity of 0.5 to 3.0 cP. When the electrolyte viscosity is more than 3.02 cP, cell resistance may be large. Also, when the electrolyte viscosity is 0.5 cP or more, ionization of Li salts may be improved.

The negative electrode includes a current collector, and a negative active material layer that includes a negative active material, a binder, and optionally a conductive agent.

The negative active material is a non-carbon-based negative active material selected from the group consisting of Si, silicon oxide ($SiO_x$, $0<x<2$), Si-M (where M is at least one selected from the group consisting of Al, Sn, Ag, Fe, Bi, Mg, Zn, In, Ge, Pb, and Ti), $SnO_2$, Sn, and combinations thereof.

The current collector may be selected from the group consisting of a copper foil, a nickel foil, a stainless steel foil, a titanium foil, a nickel foam, a copper foam, a polymer substrate coated with a conductive metal, and combinations thereof. As a specific, non-limiting example, the current collector may be a copper foil or a nickel foil.

Examples of the binder include, but are not limited to, polyvinyl alcohol, carboxylmethyl cellulose, hydroxypropylene cellulose, diacetylene cellulose, polyvinyl chloride, carboxylated polyvinyl chloride, polyvinyldifluoride, a polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

Furthermore, the negative electrode may include a conductive agent to improve the conductivity of the negative active materials. Any electrically conductive material may be used as a conductive agent unless it causes a chemical change. Examples of the conductive agent include natural graphite, artificial graphite, carbon black, acetylene black, ketjen black, carbon fiber, a metal powder or a metal fiber including copper, nickel, aluminum, silver, and so on, or a polyphenylene derivative.

The positive electrode includes a current collector, and a positive active material layer that includes a positive active material, a binder, and a conductive agent.

The positive active material may be a lithiated intercalation compound that reversibly intercalates and deintercalates lithium. Specifically, the positive active material may include a composite oxide including lithium and a metal selected from the group consisting of cobalt, manganese, nickel, and combinations thereof, and more specifically may be exemplified by compounds of the following Formulae 3 to 26.

[Chemical Formula 3]

wherein, in the above formula, $0.95 \leq a \leq 1.1$ and $0 \leq b \leq 0.5$ and A, T and D are as defined below.

[Chemical Formula 4]

wherein, in the above formula, $0.95 \leq a \leq 1.1$, $0 \leq b \leq 0.5$, and $0 \leq c \leq 0.05$ and E, T and L are as defined below.

[Chemical Formula 5]

wherein, in the above formula, $0 \leq b \leq 0.5$ and $0 \leq c \leq 0.05$ and E, T and L are as defined below.

[Chemical Formula 6]

wherein, in the above formula, $0.95 \leq a \leq 1.1$, $0 \leq b \leq 0.5$, $0 \leq c \leq 0.05$, and $0 < \alpha \leq 2$ and T and D are as defined below.

[Chemical Formula 7]

wherein, in the above formula, $0.95 \leq a \leq 1.1$, $0 \leq b \leq 0.5$, $0 \leq c \leq 0.05$, and $0 < \alpha < 2$ and T and L are as defined below.

[Chemical Formula 8]

wherein, in the above formula, $0.95 \leq a \leq 1.1$, $0 \leq b \leq 0.5$, $0 \leq c \leq 0.05$, and $0 < \alpha < 2$ and T and L are as defined below.

[Chemical Formula 9]

wherein, in the above formula, $0.95 \leq a \leq 1.1$, $0 \leq b \leq 0.5$, $0 \leq c \leq 0.05$, and $0 < \alpha \leq 2$ and T and D as defined below.

[Chemical Formula 10]

wherein, in the above formula, $0.95 \leq a \leq 1.1$, $0 \leq b \leq 0.5$, $0 \leq c \leq 0.05$, and $0 < \alpha < 2$ and T and L are as defined below.

[Chemical Formula 11]

wherein, in the above formula, $0.95 \leq a \leq 1.1$, $0 \leq b \leq 0.5$, $0 \leq c \leq 0.05$, and $0 < \alpha < 2$ and T and L are as defined below.

[Chemical Formula 12]

wherein, in the above formula, $0.90 \leq a \leq 1.1$, $0 \leq b \leq 0.9$, $0 \leq c \leq 0.5$, and $0.001 \leq d \leq 0.1$ and E and G are as defined below.

[Chemical Formula 13]

wherein, in the above formula, $0.90 \leq a \leq 1.1$, $0 \leq b \leq 0.9$, $0 \leq c \leq 0.5$, $0 \leq d \leq 0.5$, and $0.001 \leq e \leq 0.1$.

[Chemical Formula 14]

wherein, in the above formula, $0.90 \leq a \leq 1.1$ and $0.001 \leq b \leq 0.1$ and G is as defined below.

[Chemical Formula 15]

wherein, in the above formula, 0.90≤a≤1.1 and 0.001≤b≤0.1 and G is as defined below.

$$Li_aMnG_bO_2 \quad \text{[Chemical Formula 16]}$$

wherein, in the above formula, 0.90≤a≤1.1 and 0.001≤b≤0.1 and G is as defined below.

$$Li_aMn_2G_bO_4 \quad \text{[Chemical Formula 17]}$$

wherein, in the above formula, 0.90≤a≤1.1 and 0.001≤b≤0.1 and G is as defined below.

$$QO_2 \quad \text{[Chemical Formula 18]}$$

wherein, in the above formula, Q is as defined below.

$$QS_2 \quad \text{[Chemical Formula 19]}$$

wherein, in the above formula, Q is as defined below.

$$LiQS_2 \quad \text{[Chemical Formula 20]}$$

wherein, in the above formula, Q is as defined below.

$$V_2O_5 \quad \text{[Chemical Formula 21]}$$

$$LiV_2O_5 \quad \text{[Chemical Formula 22]}$$

$$LiZO_2 \quad \text{[Chemical Formula 23]}$$

wherein, in the above formula, Z is as defined below.

$$LiNiVO_4 \quad \text{[Chemical Formula 24]}$$

$$Li_{(3-f)}J_2(PO_4)_3 \ (0 \leq f \leq 3) \quad \text{[Chemical Formula 25]}$$

wherein, in the above formula, J is as defined below.

$$Li_{(3-f)}Fe_2(PO_4)_3 \ (0 \leq f \leq 2) \quad \text{[Chemical Formula 26]}$$

In the above Formulae 3 to 26,
A is selected from the group consisting of Ni, Co, Mn, and combinations thereof;
T is selected from the group consisting of Al, Ni, Co, Mn, Cr, Fe, Mg, Sr, V, a rare earth element, and combinations thereof;
D is selected from the group consisting of O, F, S, P, and combinations thereof;
E is selected from the group consisting of Co, Mn, and a combination thereof;
L is selected from the group consisting of F, S, P, and combinations thereof;
G is an element selected from the group consisting of Al, Cr, Mn, Fe, Mg, Sr, V, lanthanide elements such as La, or Ce, and combinations thereof;
Q is selected from the group consisting of Ti, Mo, Mn, and combinations thereof;
Z is selected from the group consisting of Cr, V, Fe, Sc, Y, and combinations thereof; and
J is selected from the group consisting of V, Cr, Mn, Co, Ni, Cu, and combinations thereof.

The binder improves the binding properties of positive active material particles with each other, and attaches the positive active material particles to a current collector. Examples of the binder include, but are not limited to, polyvinyl alcohol, carboxylmethyl cellulose, hydroxypropylene cellulose, diacetylene cellulose, polyvinylchloride, carboxylated polyvinylchloride, polyvinyldifluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive agent improves the electrical conductivity of the electrode. Any electrically conductive material can be used as a conductive agent unless it causes a chemical change. Examples of the conductive agent include natural graphite, artificial graphite, carbon black, acetylene black, ketjen black, a carbon fiber, a metal powder or a metal fiber including copper, nickel, aluminum, silver, and so on, or a polyphenylene derivative.

The current collector may be Al, but is not limited thereto.

The negative electrode may be fabricated as follows: a composition for a negative active material layer is prepared by mixing the negative active material, a binder, and optionally a conductive agent, and then the composition for a negative active material layer is coated onto a current collector. The positive electrode may be fabricated as follows: a composition for a positive active material layer is prepared by mixing the positive active material, a binder, and a conductive agent, and then the composition for a positive active material layer is coated onto a current collector. The method of manufacturing an electrode is well known in this art, so a detailed description is not necessary here. The solvent may include N-methylpyrrolidone, but it is not limited thereto.

The rechargeable lithium battery may include a separator between the positive electrode and the negative electrode, as needed. The separator may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator. As a non-limiting example, a microporous membrane made of a polyolefin such as polyethylene and polypropylene may be used.

Figure 1:
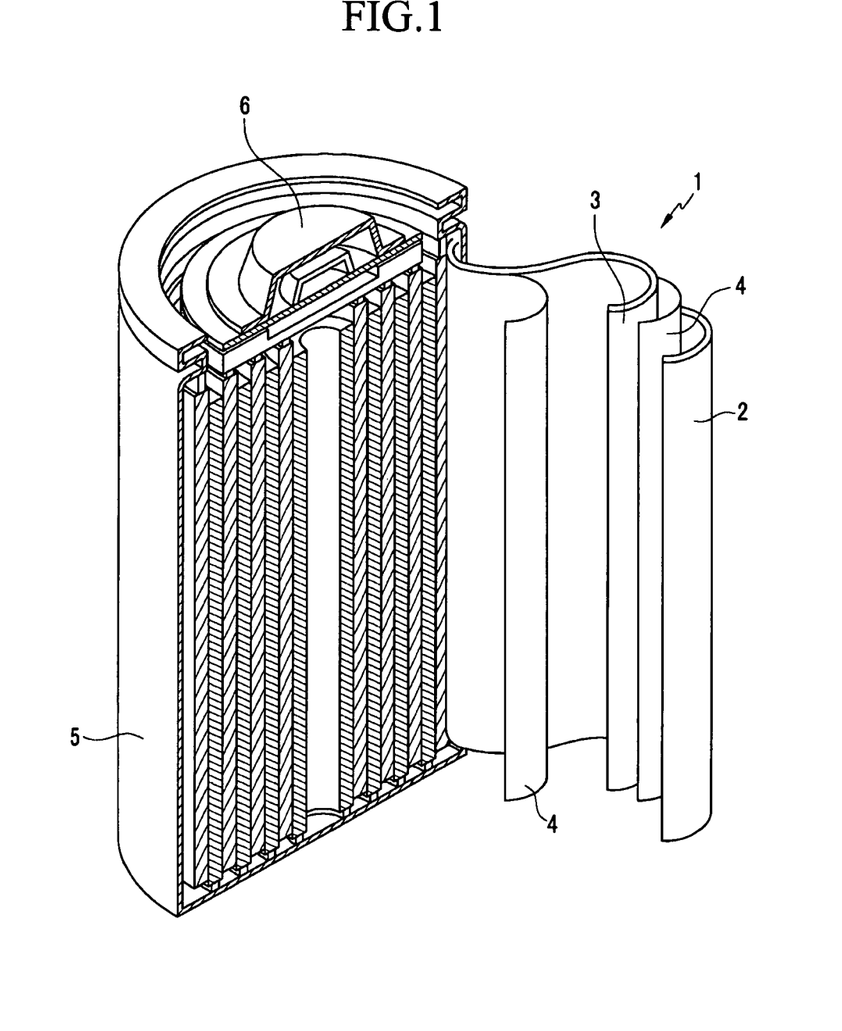
FIG. 1 is a schematic view of a rechargeable lithium battery according to one embodiment of the present invention.

FIG. 1 is a schematic view of a rechargeable lithium battery 1 according to one embodiment of the present invention.

The rechargeable lithium battery 1 is mainly constructed of a negative electrode 2, a positive electrode 3, a separator 4 interposed between the positive electrode 3 and the negative electrode 2, and an electrolyte in which the separator 4 is immersed, and in addition, a cell case 5 and a sealing member 6 sealing the cell case 5. Even though the rechargeable lithium battery shown in FIG. 1 is formed in a cylindrical shape, it is to be understood that a rechargeable lithium battery according to aspects of the present invention may be formed into various shapes such as a prismatic, a coin, or a sheet shape.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, including cylindrical, prismatic, or coin-type batteries, and may be a thin film battery or be rather bulky battery in size. Structures and fabricating methods for lithium batteries pertaining to the present invention are well known in the art.

The following examples illustrate aspects of the present invention in more detail. These examples, however, should not in any sense be interpreted as limiting the scope of the present invention.

EXAMPLES 1 AND 2 AND COMPARATIVE EXAMPLES 1 TO 8

Electrolytes having the compositions of the following Table 1 were prepared.

In Table 1, amounts of components are shown in parentheses. The first additive amount refers to parts by weight based on 100 parts by weight of an electrolyte, the non-aqueous organic solvent composition ratios refer to volume percents of the total solvent, the $LiPF_6$ amount refer to mol/L, and the $LiB(C_2O_4)_2$ amount refers to parts by weight. FEC denotes monofluoroethylene carbonate, VC denotes vinylene carbonate, EC denotes ethylene carbonate, EMC denotes ethylmethyl carbonate and DMC denotes dimethyl carbonate.

TABLE 1

| | Negative active material | Non-aqueous organic solvent (volume %) | Lithium salt (M) | First additive (parts by weight) | Second additive (parts by weight) |
|---|---|---|---|---|---|
| Ex. 1 | silicon oxide | EC (20) EMC (80) | $LiPF_6$ (1.3) | FEC (5) | $LiB(C_2O_4)_2$ (2) |
| Ex. 2 | Si powder | EC (20) EMC (80) | $LiPF_6$ (1.3) | FEC (10) | $LiB(C_2O_4)_2$ (3) |
| Comp. Ex. 1 | silicon oxide | EC (20) EMC (80) | $LiPF_6$ (1.3) | — | — |
| Comp. Ex. 2 | silicon oxide | EC (20) EMC (80) | $LiPF_6$ (1.3) | FEC (5) | — |
| Comp. Ex. 3 | silicon oxide | EC (20) EMC (80) | $LiPF_6$ (1.3) | — | $LiB(C_2O_4)_2$ (2) |
| Comp. Ex. 4 | Si powder | EC (30) EMC (70) | $LiPF_6$ (1.3) | FEC (15) | — |
| Comp. Ex. 5 | Si powder | EC (30) EMC (70) | $LiPF_6$ (1.3) | VC (3) | — |
| Comp. Ex. 6 | graphite powder | EC (30) EMC (70) | $LiPF_6$ (1.3) | FEC (15) | — |
| Comp. Ex. 7 | Si powder | EC (45) DMC (55) | $LiPF_6$ (1) | FEC (10) | $LiB(C_2O_4)_2$ (2) |
| Comp. Ex. 8 | silicon oxide | EC (20) EMC (80) | $LiBF_4$ (1.3) | FEC (5) | $LiB(C_2O_4)_2$ (2) |

Lithium cobalt oxide ($LiCoO_2$) as a positive active material and carbon black as a conductive agent at a weight ratio of 95:2 were mixed to prepare a mixture. Polyvinylidene fluoride as a binder was dissolved in N-methyl-2-pyrrolidone as a solvent to prepare a binder solution, and then the mixture was added to the binder solution to prepare a positive electrode slurry. The prepared positive electrode slurry was applied onto a 20 μm-thick aluminum foil using a doctor blade, then dried at 120° C. for 24 hours under a vacuum atmosphere to volatilize N-methyl-2-pyrrolidone, and then compressed to fabricate a positive electrode.

The negative active materials shown in Table 1 were respectively mixed with a binder solution comprising polyvinylidene fluoride dissolved in N-methylpyrrolidone, to prepare a negative electrode slurry. The prepared negative electrode slurry was applied onto a 14 μm-thick copper foil using a doctor blade, then dried at 120° C. for 24 hours under a vacuum atmosphere to volatilize N-methyl-2-pyrrolidone, and then compressed to fabricate a negative electrode.

Rechargeable lithium battery cells were fabricated using the fabricated positive and negative electrodes, a separator, and electrolytes according to Examples 1 and 2 and Comparative Examples 1 to 8 in accordance with a conventional battery fabrication method.

Viscosity Measurement

Viscosities of the electrolytes according to Examples 1 and 2 and Comparative Examples 1 to 8 were measured using an SV-10 viscometer at 25° C., under a 30 Hz frequency. The measurement results are shown in the following Table 2.

TABLE 2

| | Viscosity (cP) |
|---|---|
| Example 1 | 2.95 |
| Example 2 | 3.0 |
| Comparative Example 1 | 2.5 |
| Comparative Example 2 | 2.65 |
| Comparative Example 3 | 2.8 |
| Comparative Example 4 | 3.10 |
| Comparative Example 5 | 3.03 |
| Comparative Example 6 | 3.10 |
| Comparative Example 7 | 3.5 |
| Comparative Example 8 | 3.2 |

As shown in Table 2, electrolyte viscosities of Examples 1 and 2 and Comparative Examples 1 to 3 were 3.0 cP or less, while those of Comparative Examples 4 to 6 were 3.03 cP or more. From these results, it is expected that, as the ethylene carbonate content increases, the electrolyte viscosity increases and the cycle-life decreases.

Battery Characteristic Measurement

Cycle-life characteristics of the battery cells according to Example 1 and Comparative Examples 1 to 3 were measured as follows.

Figure 2:
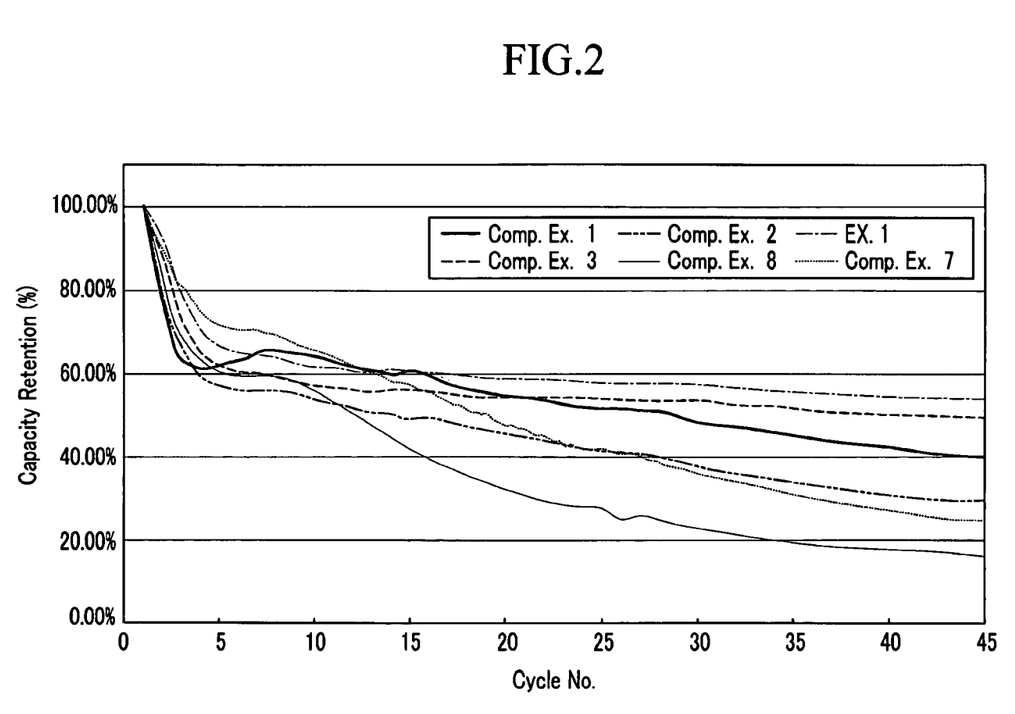
FIG. 2 shows the capacity retention of rechargeable lithium battery cells according to Example 1 and Comparative Examples 1 to 3.

The battery cells according to Example 1 and Comparative Examples 1, 2, 3, 7, and 8 were charged at 0.2 C to a voltage of 4.2V, and then discharged to a voltage of 3.0V. The charge and discharge were repeated 45 times. The $45^{th}$ capacity retention was measured. The results are shown in FIG. 2. The $45^{th}$ capacity retention refers to a ratio of the $45^{th}$ cycle discharge capacity relative to the first cycle discharge capacity.

As shown in FIG. 2, the capacity retention of the battery cell according to Example 1 was similar to that of Comparative Examples 1 to 3 up to 10 cycles. However, after the $15^{th}$ cycle, capacity retention of the cell according to Example 1 was slightly decreased, while the capacity retention of the cells of Comparative Examples 1, 2, 3, 7, and 8 was sharply decreased and at $40^{th}$ cycle, capacity retention was decreased to 40% or less.

From the results of Table 2 and FIG. 2, it can be seen that the cells according to Comparative Example 1 without the first and second additives, and the cells according to Comparative Examples 2 and 3 including either one of the first additive and the second additive, showed viscosities of 3.0 cP or less, but their cycle-lives were significantly worse.

On the contrary, the cell according to Examples 1 including a stable passivation film on a negative electrode surface showed excellent cycle-life characteristic compared to the cells of Comparative Examples 1 to 3. As shown in FIG. 2, even when both the first and second additives are included, cycle-life characteristics may be inferior when the content of EC is more than 20 volume %.

Effect of Electrolyte Compositions According to a Kind of Negative Active Material The capacity retention of the battery cells according to Comparative Example 4 and Comparative Example 6 was measured according to the same method as in Example 1. The results are shown in the following Table 3.

TABLE 3

| | 45$^{th}$ capacity retention |
|---|---|
| Comparative Example 4 | 20% |
| Comparative Example 6 | 97.5% |

As shown in Table 3, even though the same electrolyte including EC, EMC, LiPF$_6$, and FEC was used, a battery cell according to Comparative Example 4 including a Si negative active material exhibited very low capacity retention of 20%, while a battery cell according to Comparative Example 6 including a graphite negative active material exhibited high capacity retention of 97.5%. That is, when using a graphite for a negative active material, excellent cycle-life characteristics can be obtained without LiB(C$_2$O$_4$)$_2$, whereas when using Si for a negative active material, the life cycle is inferior if LiB(C$_2$O$_4$)$_2$ is not included.

Passivation Film Analysis

Figure 3A:
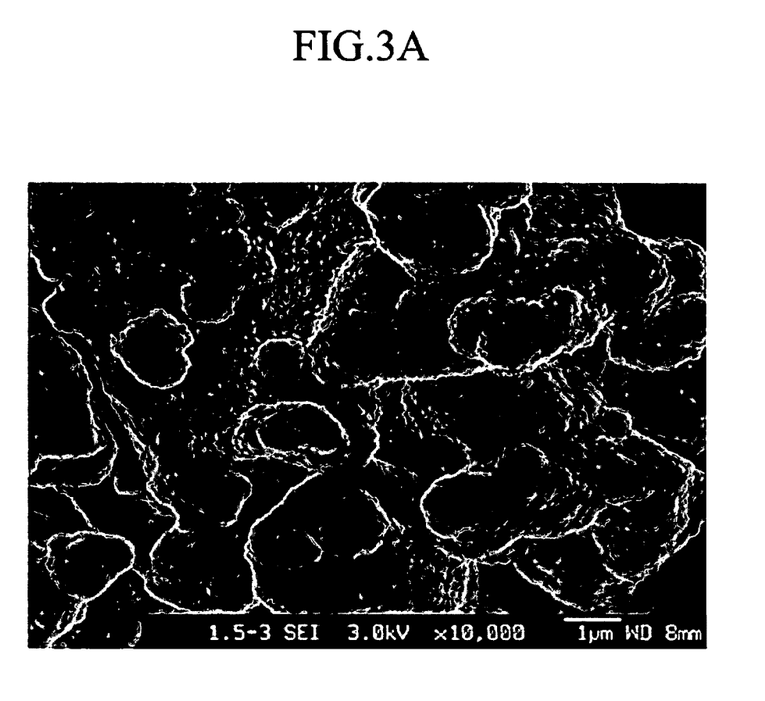
FIG. 3A represents a scanning electron microscope (SEM) image showing a passivation film disposed on the surface of the negative electrode according to Example 1.
Figure 3B:
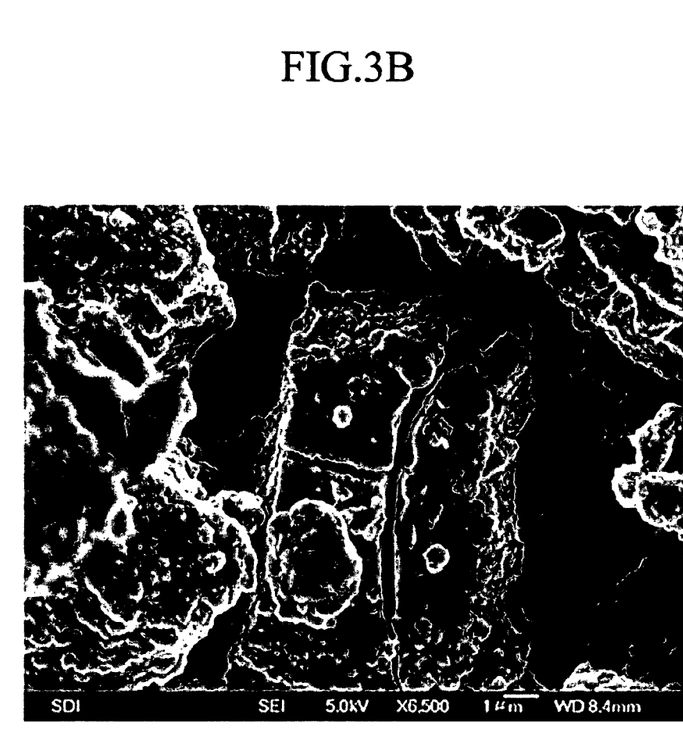
FIG. 3B represents a scanning electron microscope (SEM) image showing a passivation film disposed on the surface of the negative electrode according to Comparative Example 1.

FIGS. 3A and 3B respectively represent SEM images showing passivation films on surfaces of negative electrodes according to Example 1 and Comparative Example 1 after charge and discharge. As shown in FIGS. 3A and 3B, the negative electrode corresponding to Example 1, using an electrolyte including 5 parts by weight of the first additive and 2 parts by weight of LiB(C$_2$O$_4$)$_2$ for the second additive, has an uniform passivation film, but the negative electrode corresponding to Comparative Example 1, using an electrolyte including LiPF$_6$, has cracks on the surface of the active material. The cracks expose the internal side of the active materials, and additional solution decomposition reactions at the exposed surface of the active materials may occur resulting in decrease of cycle-life characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable lithium battery comprising:
a negative electrode including a non-carbon-based negative active material, wherein the non-carbon-based negative electrode comprises at least one selected from the group consisting of Si, silicon oxide (SiO$_x$, 0<X>2), Si-M (M is at least one metal selected from the group consisting of Al, Sn, Ag, Fe, Bi, Zn, In, Ge, Pb, and Ti), SnO$_2$, Sn, and combinations thereof;
a positive electrode including a positive active material that reversibly intercalates and deintercalates lithium ions; and
an electrolyte consisting essentially of: a non-aqueous organic solvent that includes ethylene carbonate in an amount of 20 volume % or less based on a total volume of the non-aqueous organic solvent, a lithium salt including LiPF$_6$, a first additive represented by the following Formula 1 and a second additive that is LiB(C$_2$O$_4$)$_2$ in an amount of about 0.1 to about 5 parts by weight based on 100 parts by weight of the electrolyte, wherein the electrolyte has a viscosity of 3.02 cP or less:

[Chemical Formula 1]

wherein, in the above Formula 1, R$_1$ and R$_2$ are independently selected from the group consisting of hydrogen, a halogen, a cyano (CN), a nitro (NO$_2$), and a C1 to C5 fluoroalkyl, provided that at least one of R$_1$ and R$_2$ is selected from the group consisting of a halogen, a cyano (CN), a nitro (NO$_2$), and a C1 to C5 fluoroalkyl.

2. The rechargeable lithium battery of claim 1, wherein the ethylene carbonate is present in an amount of 5 to 20 volume %.

3. The rechargeable lithium battery of claim 2, wherein the non-aqueous organic solvent further includes, in addition to the ethylene carbonate, an ether-based, carbonate-based, ester-based, ketone-based, alcohol-based, or aprotic solvent.

4. The rechargeable lithium battery of claim 2, wherein the non-aqueous organic solvent further includes, in addition to the ethylene carbonate, at least one solvent selected from the group consisting of dimethoxyethane (DME), bis (2-methoxyethyl)ether (DGM), triethylene glycol dimethylether (TEGDME), tetraethylene glycol dimethylether (TetGM), polyethylene glycol dimethylether (PEGDME), propylene glycol dimethylether (PGDME), dioxolane, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), propylene carbonate (PC), butylene carbonate (BC), methyl acetate, ethyl acetate, n-propyl acetate, methylpropionate, ethylpropionate, .gamma.-butyrolactone, decanolide, valerolactone, mevalonolactone, caprolactone, cyclohexanone and ethanol, isopropyl alcohol, a nitrile of the formula X--CN, wherein X is a C2 to C20 linear, branched, or cyclic hydrocarbon group including a double bond, an aromatic ring, or an ether bond, dimethylformamide, 1,3-dioxolane and sulfolanes.

5. The rechargeable lithium battery of claim 2, wherein the non-aqueous organic solvent further includes ethyl methyl carbonate.

6. The rechargeable lithium battery of claim 1, wherein the first additive is selected from the group consisting of fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof.

7. The rechargeable lithium battery of claim 1, wherein the first additive is present in an amount of 0.1 to 10 parts by weight based on 100 parts by weight of the electrolyte.

8. The rechargeable lithium battery of claim 7, wherein the first additive is present in an amount of 1 to 8 parts by weight based on 100 parts by weight of the electrolyte.

9. The rechargeable lithium battery of claim 1, wherein LiPF$_6$ is present at a concentration of 1.15 to 2.5M.

10. The rechargeable lithium battery of claim 1, wherein LiPF$_6$ is present at a concentration of 1.3 to 2.0M.

11. The rechargeable lithium battery of claim 1, wherein the electrolyte has a viscosity of 0.5 to 3.0 cP.

12. The rechargeable lithium battery of claim 1, wherein the second additive is present in an amount of 0.2 to 3 parts by weight based on 100 parts by weight of the electrolyte.

13. The rechargeable lithium battery of claim 1, wherein the non-carbon-based negative electrode comprises Si powder or silicon oxide.

* * * * *

UNITED STATES PATENT AND TRADEMARK OFFICE
CERTIFICATE OF CORRECTION

Page 1 of 1

PATENT NO. : 8,557,447 B2
APPLICATION NO. : 12/208628
DATED : October 15, 2013
INVENTOR(S) : Doo-Kyoung Lee It is certified that error appears in the above-identified patent and that said Letters Patent is hereby corrected as shown below:

In the Claims

| | |
|---|---|
| Col. 11, line 56, Claim 1 | Delete "$0<X>2$", Insert --$0<x>2$-- |
| Col. 12, line 16, Claim 1 | Delete "$R_1$ and $R_2$ are", Insert --$R_1$ and $R_2$ are-- |
| Col. 12, line 19, Claim 1 | Delete "$R_1$ and $R_2$ is", Insert --$R_1$ and $R_2$ is-- |
| Col. 12, line 44, Claim 4 | Delete "nitrite", Insert --nitrile-- |

Signed and Sealed this
Twenty-fourth Day of February, 2015

Michelle K. Lee
*Deputy Director of the United States Patent and Trademark Office*